United States Patent
Papierniak et al.

(10) Patent No.: US 6,169,997 B1
(45) Date of Patent: Jan. 2, 2001

(54) METHOD AND APPARATUS FOR FORMING SUBJECT (CONTEXT) MAP AND PRESENTING INTERNET DATA ACCORDING TO THE SUBJECT MAP

(75) Inventors: Karen A. Papierniak, St. Paul, MN (US); James E. Thaisz, Lincroft, NJ (US); Luo-Jen Chiang, Freehold, NJ (US); Paresh B. Shah, North Plainfield, NJ (US)

(73) Assignee: NCR Corporation, Dayton, OH (US)

( * ) Notice: Under 35 U.S.C. 154(b), the term of this patent shall be extended for 0 days.

(21) Appl. No.: 09/067,804

(22) Filed: Apr. 29, 1998

(51) Int. Cl.[7] ................................................. G06F 17/30
(52) U.S. Cl. .......................................................... 707/501
(58) Field of Search .............................. 707/1, 2, 3, 501, 707/100

(56) References Cited

U.S. PATENT DOCUMENTS

| | | | |
|---|---|---|---|
| 5,544,302 | * | 8/1996 | Nguyen ................................. 395/155 |
| 5,649,218 | * | 7/1997 | Satio .................................... 395/774 |
| 5,682,540 | * | 10/1997 | Klotz, Jr. et al. ..................... 395/144 |
| 5,819,258 | * | 10/1998 | Vaithyanthan et al. .................. 707/2 |
| 5,864,856 | * | 1/1999 | Young ................................. 707/100 |
| 5,892,917 | * | 4/1999 | Myerson ........................... 395/200.4 |
| 5,913,208 | * | 6/1999 | Brown et al. ............................. 707/3 |
| 5,913,215 | * | 6/1999 | Rubinstein et al. .................... 707/10 |
| 5,963,969 | * | 10/1999 | Tidwll ................................. 707/531 |
| 5,968,125 | * | 10/1999 | Garrick et al. ........................ 709/224 |

OTHER PUBLICATIONS

Glenn Fleishman Web Log Analysis Who's Doing What, When?, Web Developer vol. 2 No. 2, May 1996.*
Mark R. Brown Special Edition USING Netscape 2 Second Edition QUE, 1995.*

* cited by examiner

Primary Examiner—Joseph H. Feild
Assistant Examiner—Robert D Bourque
(74) Attorney, Agent, or Firm—Ying Tuo

(57) ABSTRACT

Currently, a web site stores Internet data indicating file access status for the files that have been accessed in response to requests from web browsers. Unfortunately, the Internet data are kept as a set of separate and non-correlated data records that are chronologically arranged according to the times at which the requests have been received and processed. Consequently, the Internet data are not arranged meaningful to management and business operation. The present invention correlates web page files (HTML, SHTML, DHTML, or CGI files) with subject areas (such as sports, news, entertainment, restaurant, shopping, computing, business, health, family, travel and weather). In this way, the Internet data are presented in a format meaningful to management and business operation.

14 Claims, 12 Drawing Sheets

RECORD $J_1$ : ....... (FOR WEB PAGE FILE)

RECORD $J_2$ : ....... (FOR GIF FILE)

RECORD $J_3$ : ....... (FOR JPEG FILE)

RECORD $J_4$ : ....... (FOR AVI FILE)

METHOD AND APPARATUS FOR FORMING SUBJECT (CONTEXT) MAP AND PRESENTING INTERNET DATA ACCORDING TO THE SUBJECT MAP

BACKGROUND OF THE INVENTION

The present invention relates generally to a method and apparatus for presenting Internet data in a format meaningful to management and business operation.

With the development in information technology and networking infrastructure, more and more business transactions are being conducted electronically over the Internet. Using the Internet to conduct business transactions are now getting so popular that it is currently well know as electronic commerce (or Internet commerce) by the industries and public. It is fair to predict that electronic commerce is having an enormous impact on the way businesses will be conducted and managed in the future. Thus, there is a great interest in studying and understanding consumers' behavior and decision process in electronic commerce environment.

Traditionally, business transactions have been conducted at business premises, and there exist methods and techniques to study consumers behavior and decision process for traditional business environment. For example, a retailer can display its goods in store shelves arranged in accordance with the changes of the four seasons. By observing consumers' reactions to the arrangement, the retailer can adjust the layout of the shelves to facilitate sales of its goods.

In electronic commerce environment, a retailer or service provider typically displays information about its goods or services in a web site (which includes at least one server) via the Internet. Specifically, the server for the web site stores the information in a set of web page files, such as HTML (Hypertext Markup Language) files. In addition to containing text content, an HTML file may also contain links to other type files, such as graphic or audio files, for displaying pictures and icons and playing audio message. An HTML file may further contain links to other web page files. The other type files can be also stored on the server. By using a web browser, a customer (or a potential customer) can remotely navigate through the web site, gaining the information about the goods and services, or ordering selected goods or services. Unfortunately, unlike in traditional business environment, there is no reliable method in electronic commerce environment at the present time to measure the effectiveness of the layout of a web site. This is due to the difficulties in observing consumers' behavior and analyzing consumers' decision process over the Internet.

Historically, the Internet was designed as an open structure in which the main purpose is to exchange information freely without restriction. To obtain a web page file (such as an HTML file) from a web site, a web browser first sends a request to the server for that web site. Upon receiving the request, the server retrieves the HTML file requested and send it to the web browser. Upon receiving the HTML file, the web browser displays the HTML file as a web page. If the HTML file also contains links to other type files (such as graphic or audio files), the browser subsequently sends requests to the server for these files. Upon receiving the requests, the server retrievers these files and send them to the web browser. Upon receiving theses files, the browser displays pictures and icons on the web page, or executes an application to play audio files embedded in the web page. If the HTML file further contains a link to another HTML file, upon clicking (or activating) the link, the browser sends a further request to the server for the HTML file. Upon receiving the further request, the server retrievers the HTML files and sends it to the web browser. It should be noticed that browsers interact with web sites in a stateless fashion. On the Internet, a particular web site can be accessed by thousands of browsers in a random fashion. While a browser is sending a sequence of requests to a web site, it does not maintain a constant connection to that web site between any two consecutive requests. To a server, it has no control over the sequences of requests; a subsequent request may not have any logical relationship with the previous one; a sequence of requests may come from different web browsers; a request may be generated from a link embedded in an HTML file. Consequently, it is difficult to consecutively observe customers' activities and behavior in electronic commerce environment over the Internet.

Current technology provides mechanisms to record access status data (or Internet data) for web page and other type files while a sequence of requests are being received and processed by a server. However, the current technology does not provide mechanisms to organize and present Internet data in accordance with subject areas (such as business, education, news, . . . ), because Internet data are kept as a set of separate and non-correlated data records that are chronologically arranged according to the times at which the requests were received and processed.

Therefore, there is a need for a method and apparatus to present Internet data in a format meaningful to management and business operation.

There is another need for a method and apparatus to define rules to map web page files to subject areas that are meaningful to management and business operation.

There is yet another need for a method and apparatus to present Internet data in accordance with the subject areas.

The present invention meets these needs.

SUMMARY OF THE INVENTION

The present invention provides a novel method and associated apparatus for processing Internet data.

Currently, a web site is able to store Internet data indicating file access status for the files that have been accessed in response to requests from web browsers. Unfortunately, the Internet data are kept as a set of separate and non-correlated data records that are chronologically arranged according to the times at which the requests have been received and processed. Typically, a web page is associated with a web page file, which can further embed other type files. However, the data records indicating access status for a web page file and other type files embedded in the web page file can be scattered among multiple data records. Consequently, the Internet data are not arranged meaningful to management and business operation.

The present invention presents the Internet data into a format meaningful to management and business operation. More specifically, the present invention can correlate the data records for web page files with subject areas, such as business, education, news, health, computing, travel, weather, entertainment, hobbies, and sports, in accordance with a set of mapping rules. The mapping rules can be defined or modified by users via a user interface.

In a broad aspect, the invention provides a method used with a set of logs containing data records indicating access status for a plurality of web page files. The method comprises the steps of:

(a) storing a plurality of subject areas for classifying the web page files;

(b) storing a plurality of mapping rules to map the data records into the subject areas;

(c) collecting data records from the logs; and (d) correlating the data records with the subject areas based on the mapping rules.

These and other features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawing, in which:

FIG. 3 shows exemplary data records in server logs;

DETAILED DESCRIPTION OF THE PREFERRED EMBODIMENT

The present invention comprises a novel method and an associated apparatus for presenting Internet data. The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
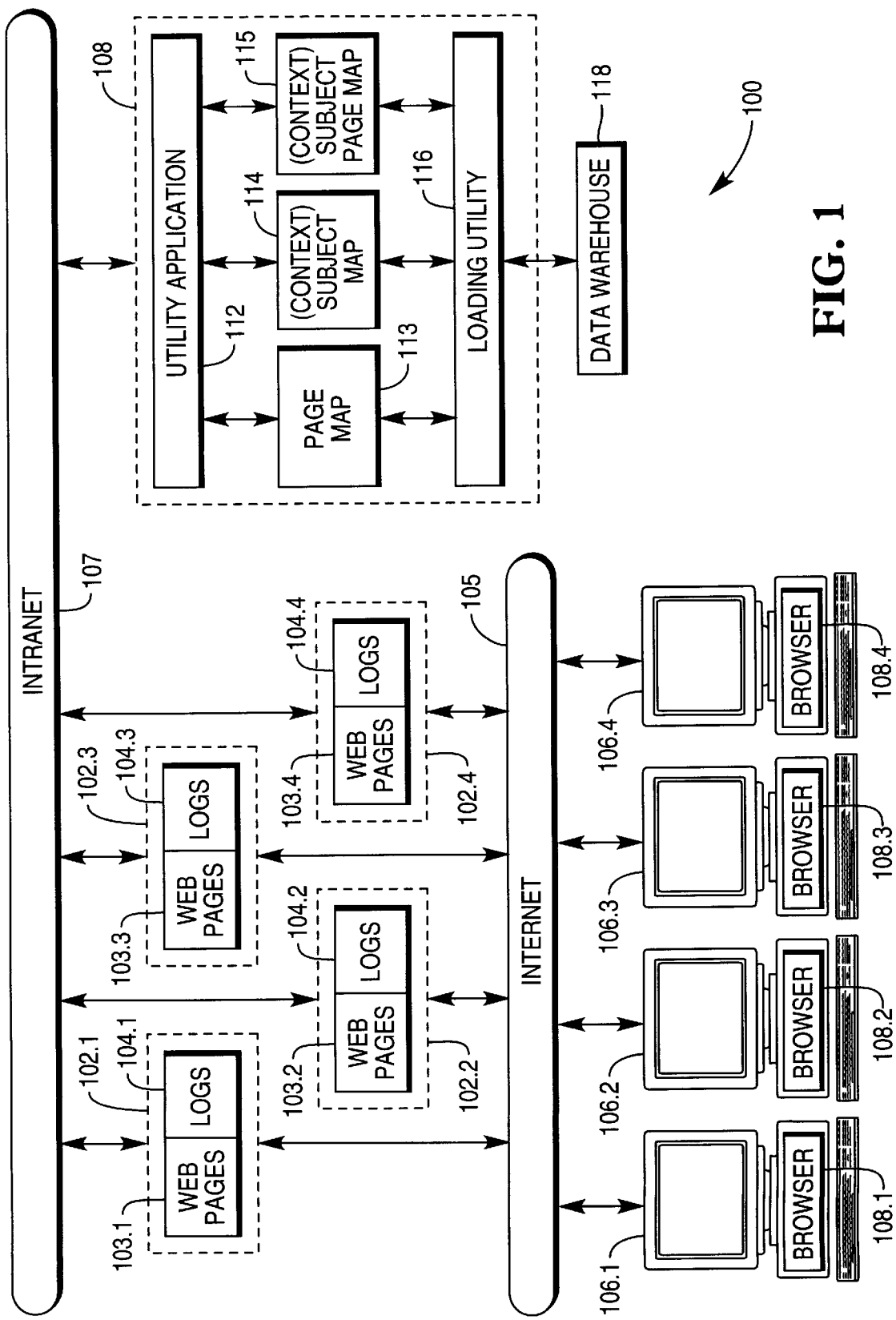
FIG. 1 shows an exemplary network system, including a novel Internet data processing computer, in accordance with the present invention.

Referring to FIG. 1, there is shown an exemplary network system 100 including Internet 105 and Intranet (or LAN—Local Area Network) 107, in accordance with the present invention.

Connected to Internet 105 are four servers ($102_{-1}$, $102_{-2}$, $102_{-3}$, and $102_{-4}$) for four respective web sites and four user terminals or computers ($106_{-1}$, $106_{-2}$, $106_{-3}$, and $106_{-4}$). Connected to Intranet 106 are four servers ($102_{-1}$, $102_{-2}$, $102_{-3}$, and $102_{-4}$) and a data processing computer 108. Connected to data processing computer 108 is a data warehouse 118.

It should be noted that, in describing the present invention, FIG. 1 shows that only four servers and four user computers are connected to Internet 105. In reality, Internet 105 connects thousands of servers and user computers.

Each of the four servers ($102_{-1}$, $102_{-2}$, $102_{-3}$, or $102_{-4}$) includes a respective web page repository ($103_{-1}$, $103_{-2}$, $103_{-3}$, or $103_{-4}$) and a respective set of server logs ($104_{-1}$, $104_{-2}$, $104_{-3}$, or $104_{-4}$). Each of the four web page repositories ($103_{-1}$, $103_{-2}$, $103_{-3}$, or $103_{-4}$) stores a plurality of web page files (such as HTML, SHTML, DHTML, or CGI files). A web page file may contain links to other type files (such as AVI, GIF, JPEG, and PNG files). (Note: HTML stands for Hypertext Markup Language, SHTML for Secure HTML, DHTML for Dynamic HTML, CGI for Common Gateway Interface, GIF for Graphics Interchange Format, JPEG for Joint Photographic Expert Group, AVI for Audio Video Interleave, and PNG for Portable Network Graphic). The other type files are also stored in one of the four servers. Each of the four set of server logs ($104_{-1}$, $104_{-2}$, $104_{-3}$, or $104_{-4}$) contains access status data (or Internet data) indicating access status for the files that have been accessed, or attempted to be accessed.

Each of the four user computers ($106_{-1}$, $106_{-2}$, $106_{-3}$, or $106_{-4}$) runs a respective web browser ($108_{-1}$, $108_{-2}$, $108_{-3}$, or $108_{-4}$), each of which is able to obtain files from any one of the four servers via Internet 105, and displays these files in a web page format. To obtain a web page file from a server, a web browser sends an Get request to that server. A Get request contains the IP address identifying the user computer on which the browser is being run and a URL (Uniform Resource Locator). The URL contains the name of and path to the web page file. Upon receiving the Get request, the server retrieves the web page file according to the URL in the Get request and sends the web page file to the user computer (on which the browser is being run) identified by the IP address in the Get request. The server then records access status data for the web page file in a server log. Upon receiving the web page file, the web browser displays it as a web page. If the web page file also contains links to other type files, the browser further sends Get requests to the server, so that these files can be obtained and displayed together with the web page file. The links embedded in the web page file contain the names of and paths to these files. After sending these files to the browser, the server records access status data for these files in the server log. If the web page file further contains a link to another web page file, in response to clicking (activating) the link, the browser sends a Get request to the server, so that the web page file can be obtained and a new web page can be displayed. This link contains the name of and path to the web page file. After sending this web page file to the user computer (on which the browser is being run), the server records access status data for the web page file in the server logs.

It should be noted that in FIG. 1 browsers ($108_{-1}$, $108_{-2}$, $108_{-3}$, and $108_{-4}$) interact with servers ($102_1$, $102_{-2}$, $102_{-3}$, and $102._4$) in a stateless fashion. The web browsers ($108._1$, $108._2$, $108._3$, and $108._4$) send requests to servers ($102._1$, $102._2$, $102._3$, and $102._4$) in a random manner. While a browser ($108._1$, $108._2$, $108._3$, or $108._4$) is sending a sequence of requests to a server ($102._1$, $102._2$, $102._3$, or $102._4$), it does not maintain a constant connection to that server between any two consecutive requests. To a server, it has no control over the sequences of requests; a subsequent request may not have any logical relationship with the previous one; a sequence of requests may come from different web browsers; a request may be generated from a link embedded in an web page file. Consequently, the Internet data are kept as a set of separate and non-correlated data records that are chronologically generated according to the times at which the requests were received and processed. Thus, the Internet data stored in the four sets of server logs ($104._1$, $104._2$, $104._3$, and $104._4$), without further processing, are not meaningful to management and business operation.

As shown in FIG. 1, data processing computer 108 contains a utility application 112, a page map 113, a subject (context) map 114, a subject (context) page map 115, and a loading utility 116. Via Intranet 107, utility application 112 is able to get access to the four sets of server logs ($104._1$, $104._2$, $104._3$, and $104._4$), to collect data from them, to process the data collected, and to store the processed data in page map 113, subject map 114, and subject page map 115. Loading utility 116 is able to load the data from page map 113, context map 114 and context page map 115 to data warehouse 118 for further processing.

Figure 2:
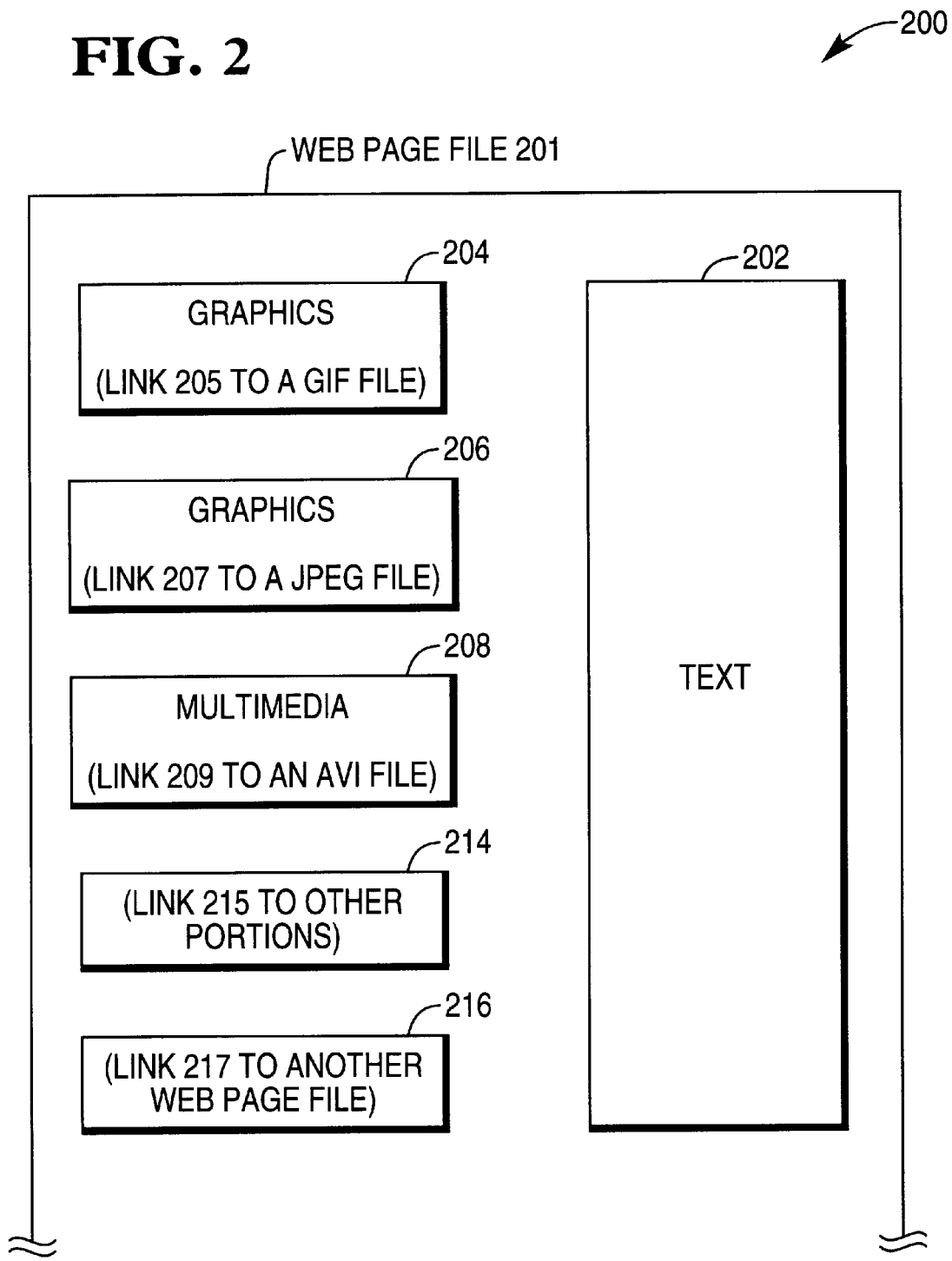
FIG. 2 shows an exemplary web page associated with a web page file.

Referring to FIG. 2, there is shown a portion of a web page 200, which is associated with a web page file (HTML, SHTML, DHTML, or CGI file) 201.

As shown in FIG. 2, the portion of web page 200 contains six regions, including: a text region 202; a graphic region 204, which is associates with a link 205 to a GIF file; a graphic region 206, which is associated with a link 207 to a JPEG file; a multimedia region 208, which is associated with a link 209 to an AVI file; a region 214, which is associated with link 215 to other portions of web page 200; and a region 216, which is associated with a link 217 to another web page file. Links 205, 207, 209, 215 and 217 are embedded in web page file 201.

Referring to FIG. 3, there is shown a plurality of exemplary data records in server logs ($104._1$, $104._2$, $104._3$, or $104._4$) in some detail.

As shown in FIG. 3, four records $J_{1-4}$ indicate the access status for web page file 201 and the other type files (GIF, JPEG and AVI files) that are linked in web page file 201. To better describe the process of generating the four records ($J_{1-4}$), it is assumed that: (1) web page file 201 is stored in page repository $102._1$, (2) web page file 201 has been accessed by browser $108._1$, (3) server $102._1$ generates records $J_{1-4}$ in server logs $104._1$, and (4) the four browsers ($102._1$, $102._2$, $102._3$, and $102._4$) are all sending Get requests to server $102._1$.

To obtain web page file 201, browser $108._1$ sends a Get request to server $102._1$ via Internet 105. The Get request contains the IP address assigned to user computer $106._1$ and an URL indicating the name of and path to web page file 201. Upon receiving the Get request, server $102._1$ retrieves web page file 201 from web page repository $104._1$ and sends it, via Internet 105, to user computer $106._1$ according to the IP address contained in the Get request. In the meantime, server $102._1$ stores information indicating access status for web page file 201 into record $J_1$. Since links 205, 207, and 209 are embedded in web page file 201 to link GIF, JPEG and AVI files respectively, web browser $108._1$ further sends three Get requests to server $102._1$. Links 205, 207 and 209 contains the file names of and paths to GIF, JPEG, and AVI files, respectively. In addition to containing the IP address assigned to user computer $106._1$, the three Get requests contain the file names of and paths to the GIF, JPEG, and AVI files, respectively. Upon receiving the three Get requests, server $102._1$ retrieves the GIF, JPEG and AVI files from web page repository $104._1$ and sends them, via Internet 105, to user computer 106.1 according to the IP address contained in the Get request. In the meantime, server $102._1$ stores information indicating access status for the GIF, JPEG, and AVI files into records $J_2$, $J_3$, and $J_4$, respectively. As shown in FIG. 2, data records $J_{1-4}$ are scattered among the other records in the server logs $104._1$, because the four browsers ($102._1$, $102._2$, $102._3$, and $102._4$) are all sending Get requests to server $102._1$, and data records in server logs $104._1$ are chronologically generated according to the times when Get requests have been received and processed by server $102._1$. It should be noted that, even though FIG. 3 depicts a process of generating access status data records for web page file 210 having a particular web page layout, the principle illustrated in FIG. 3 applies to any web page files having any web page layouts.

Typically, each of the records in server logs ($104._1$, $104._2$, $104._3$, and $104._4$) contains the following fields:

IP address assigned to the user or user's domain name, name of the request (such as Get), time stamp on which the request was received, URL (including access path to the file and parameters passed), server name, IP address of the server or server's domain name, bytes received from the browser, bytes sent to the browser, and status code indicating operational status of processing the request.

Figure 4:
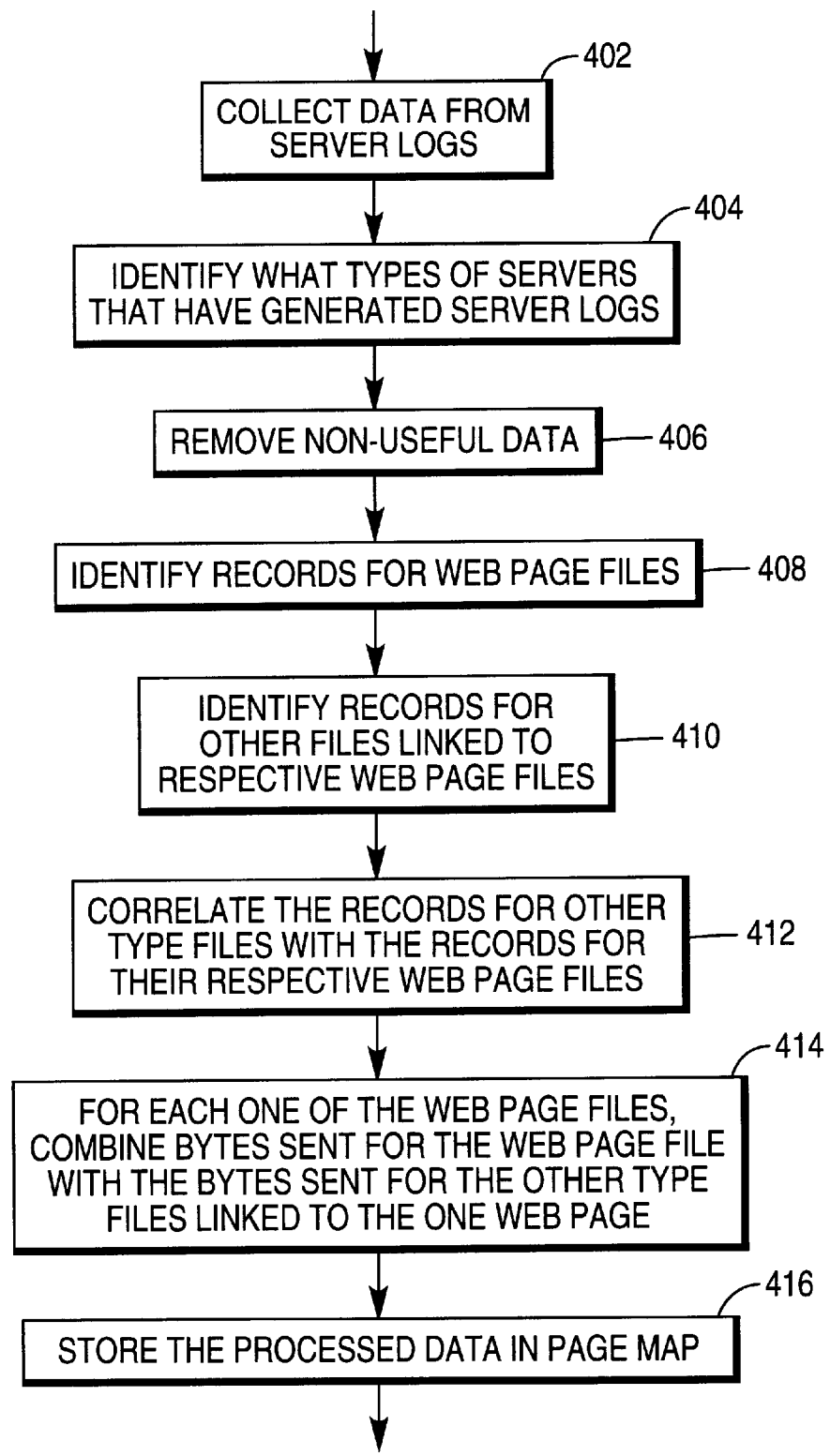
FIG. 4 shows a flowchart illustrating the operation of forming a page map, in accordance with the present invention.

Referring to FIG. 4, there is shown a flowchart illustrating the operation of forming page map 114 by utility application 112 shown in FIG. 1, in accordance with the present invention.

In step 402, utility application 112 collects Internet data stored in server logs ($104._1$, $104._2$, $104._3$, and $104._4$) via Intranet 107.

In step 404, utility application 112 identifies what types of servers that have generated the Internet data, because the four sets of server logs ($104._1$, $104._2$, $104._3$, and $104._4$) can be generated by different types of servers. For example, the four servers ($102._1$, $102._2$, $102._3$, and $102._4$) shown in FIG. 1 can be a web server, hosting web server with virtual domains, commerce server, and proxy server, respectively. Since different types of servers may generate Internet data with different formats, the data format and content in one set of server logs ($104._1$, $104._2$, $104._3$, or $104._4$) may be different from those in the other three sets of server logs. By identifying server type, utility application 112 can process the Internet data in a way that is suitable to the data format and content in the identified server logs. In doing so, utility application 112 can process and combine Internet data generated by different types of servers. In the present invention, the server type can be identified by the fields included and orders of the fields in the server logs.

In step 406, utility application 112 removes non-useful data from the data collected in step 402. By way of example, a backspace in a URL is non-useful character; one of the two "//" in a URL is a non-useful character because two "//" have the same meaning as one "/" to a server. Thus, the backspace and one "/" can be removed. By way of another example, the data in a record for retrieving a file associated to a unrecognizable URL is not useful, because no file can be found in response to the URL. Thus, the whole record can be removed. Typically, status code field in a data record indicates whether a request has been successfully processed or not. This step is advantageous because server logs may contain huge volume of data. Keeping non-useful data in applications, such data warehouse applications, not only is wasteful of storage space, it may also cause errors in the reports and during analysis.

In step 408, utility application 112 identifies records that store data indicating file access status for web page files (HTML, STHML, DHTML, or CGI files). In the example shown in FIG. 3, record $J_{-1}$ for web page file 201 shown in FIG. 2 will be identified in step 408.

In step 410, utility application 112 identifies records that store data indicating file access status for other type files (such as GIF, JPEG and AVI files) that are linked into respective web page files. In the example shown FIG. 3, records $J_{2-3}$ can be identified to be linked to web page file 201 shown in FIG. 2.

In step 412, utility application 112 correlates the records for the identified other type files with their respective identified web page files by using the IP address (assigned to the user computer running the browser) and time stamp fields in the these records. As described above, if any other type files are linked into a web page file after a browser has received the web page file, the browser immediately sends requests out to retrieve the other type files. Hence, the IP address in the request for retrieving the web page file is the same IP address in the requests for retrieving the other type files. Also the time at which the request for retrieving the web page file was received should be close to those at which the requests for retrieving the other type files were received. Therefore, utility application 112 correlates the following records together:

(1) a particular record for a particular web page file, which contains an IP address and time stamp, and (2) a set of records for the other type files, which contain the same IP address with that in the particular record; and contain the time stamps close to (within one or two seconds, for example) that in the particular record.

In the example shown in FIG. 3, records $J_{2-4}$ can be correlated with record $J_1$.

In step 414, for each of the web page files, utility application 112 calculates a length by combining the bytes sent for the one web page file with the bytes sent for the other type files linked in the one web page file. In the example shown in FIG. 2, the bytes sent for web page file 201 will be combined with the bytes sent for GIF, JPEG and AVI files. The length is useful for an Internet Service Provider to manage its operation, because it can provide the information to determine the bandwidth used and the cost to send these files.

In step 416, utility application 112 stores the data processed in the steps (406, 408, 410, 412, and 414) in page map 113 shown in FIG. 1.

Figure 5:
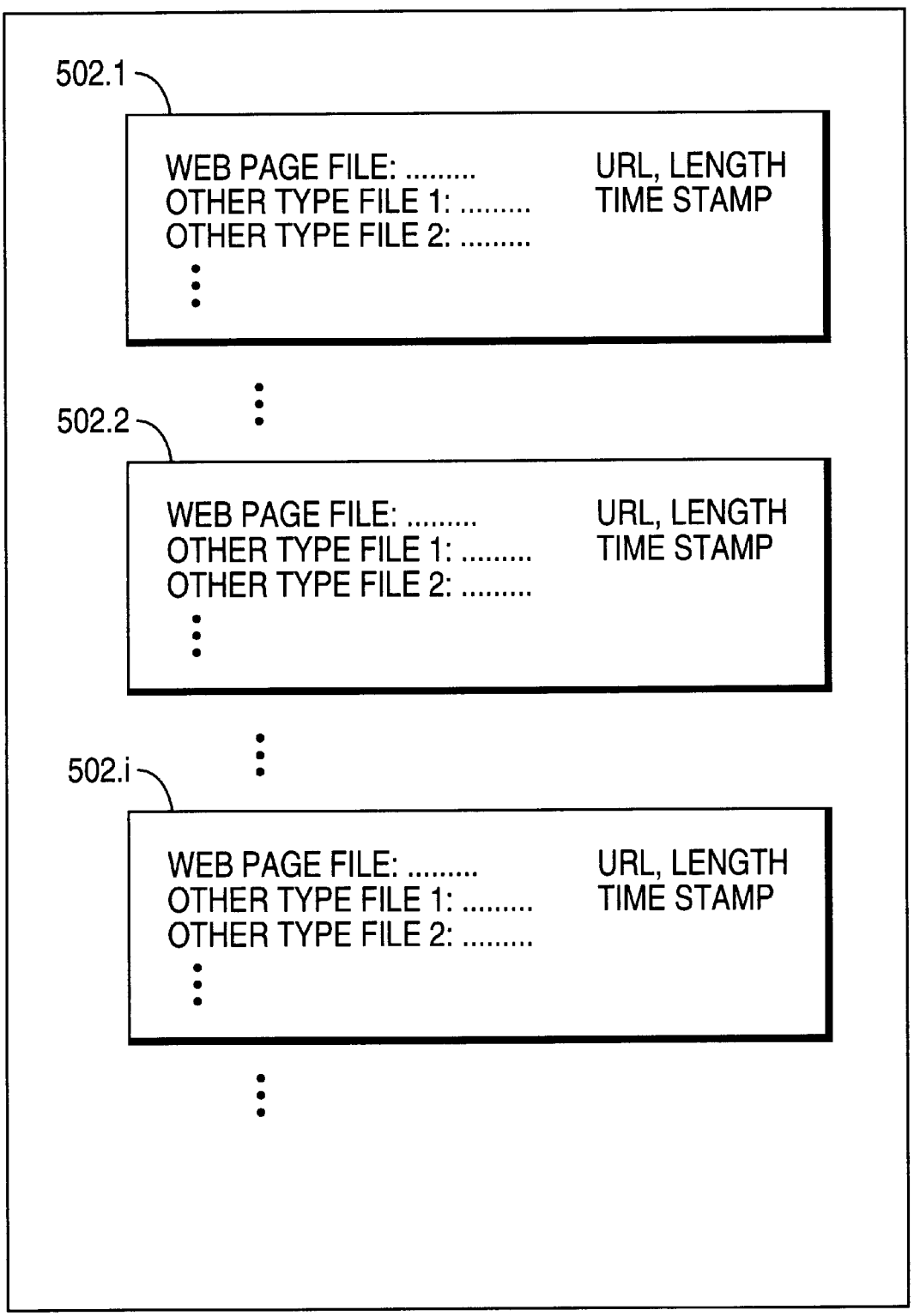
FIG. 5 shows exemplary data records stored in the page map shown in FIG. 1, in accordance with the present invention.

Referring to FIG. 5, there is shown a plurality of exemplary data records in page map 113, in accordance with the present invention.

As shown in FIG. 5, page map 114 contains a plurality of data records $502_{-1}, 502_{-2}, \ldots, 502_{-1}, \ldots$ Each of the records may include several physical or logical storage units. Each of the records stores the IP address used by a browser to retrieve a web page file, the correlated information indicating the access status for the web page file and other type files linked to the web page file, and a time stamp. Each of the records also stores a combined length for all the bytes sent for the web page file and the other type files.

Figure 6:
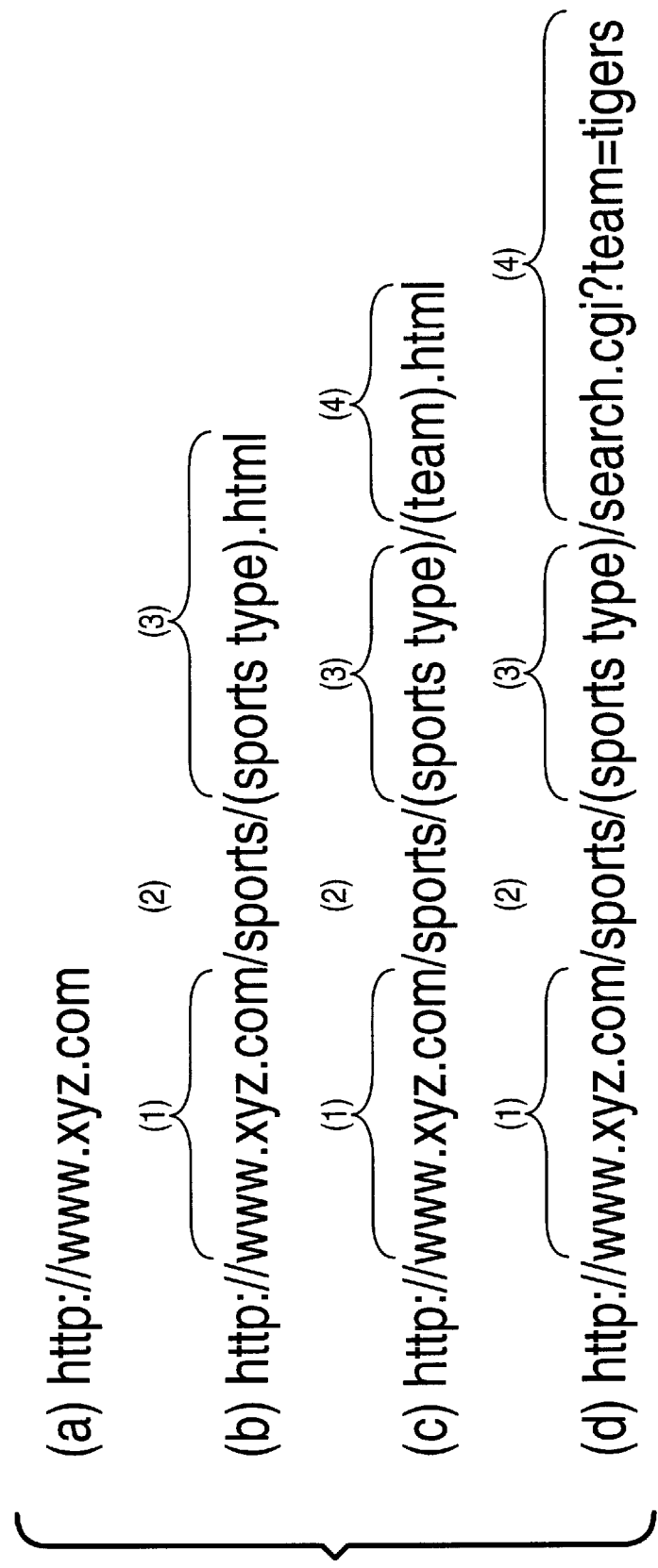
FIG. 6 shows exemplary URLs illustrating a hierarchical structure of web page files in a web site.

Referring to FIG. 6, there is shown a plurality of exemplary URLs, illustrating a hierarchical structure of the web pages in a web site.

As shown in FIG. 6, item (a), http://www.xyz.com, is a URL linking to the web site or home page file (level 1 web page file) of XYZ company. The home page file may contain the links, as shown in item (b), to a set of web page files (level 2 web page files) with each of which containing the information about a type of sport.

As shown in item (b), http://www.xyz.com/sports/(sport type).html is a URL link to a web page file containing the information about a type of sport. URL http://www.xyz.com/sport/(sport type).html contains three sections divided by two single slashes (/). Specifically, section (1) "xyz.com" indicates the domain name or IP address of xyz company's web site, section (2) "sports" indicates the name of and path to xyz company's web page directory "sports", and section (3) "(sports type)" indicates the name of and path to a file (sports_type).html. In section (3), the names of sports type can be: football, baseball, basketball, hockey, tennis, table tennis, . . . A level 2 web page file may contain links (shown in items (c) and (d)) to a set of web page files (level 3 web pages), or contain a search form which allows user to enter search key word(s). For example, in a web page file containing the information about baseball, a user can search baseball team by enter a search key word "tigers" into the search form contained in the web page file.

As shown in item (c), http://www.xyz.com/sports/(sport type)/(team).html is a URL link to a web page file containing the information about a team in a type of sport. URL http://www.xyz.com/sports/(sports type)/(team).html contains four sections divided by three single slashes (/). Specifically, section (1) "xyz.com" indicates the domain name or the IP address of xyz company's web site, section (2) "sports" indicates the name of and path to xyz company's web page directory "sports", section (3) (sports type) indicates xyz company's web page sub directory "sports-type", and section (4) "team" indicates the name of and path of a web page file (team).html.

In describing item (d), it is assumed that a user has entered a search key word "tigers" into the search form in a level 3 web page file. As shown in item (d), http://www.xyz.com/sports/(sports type)/search.cgi? team=tigers is a URL link to web page files based on the search command "team =tigers" in the URL. URL http://www.xyz.com/sports/(sports type)/search.cgi? team=tigers contains four sections divided by three single slashes (/). Specifically, section (1) "xyz.com" indicates the domain name or the IP address of xyz company's web site, section (2) "sports" indicates the name of and path to xyz company's web page directory "sports", section (3) "(sports type)" indicates xyz company's web page sub directory "sports_type", and section (4) "search.cgi?team= tigers" indicates the name of and path of the web page files based on the search performed by a cgi (Common Gateway Interface) program.

Figure 7:
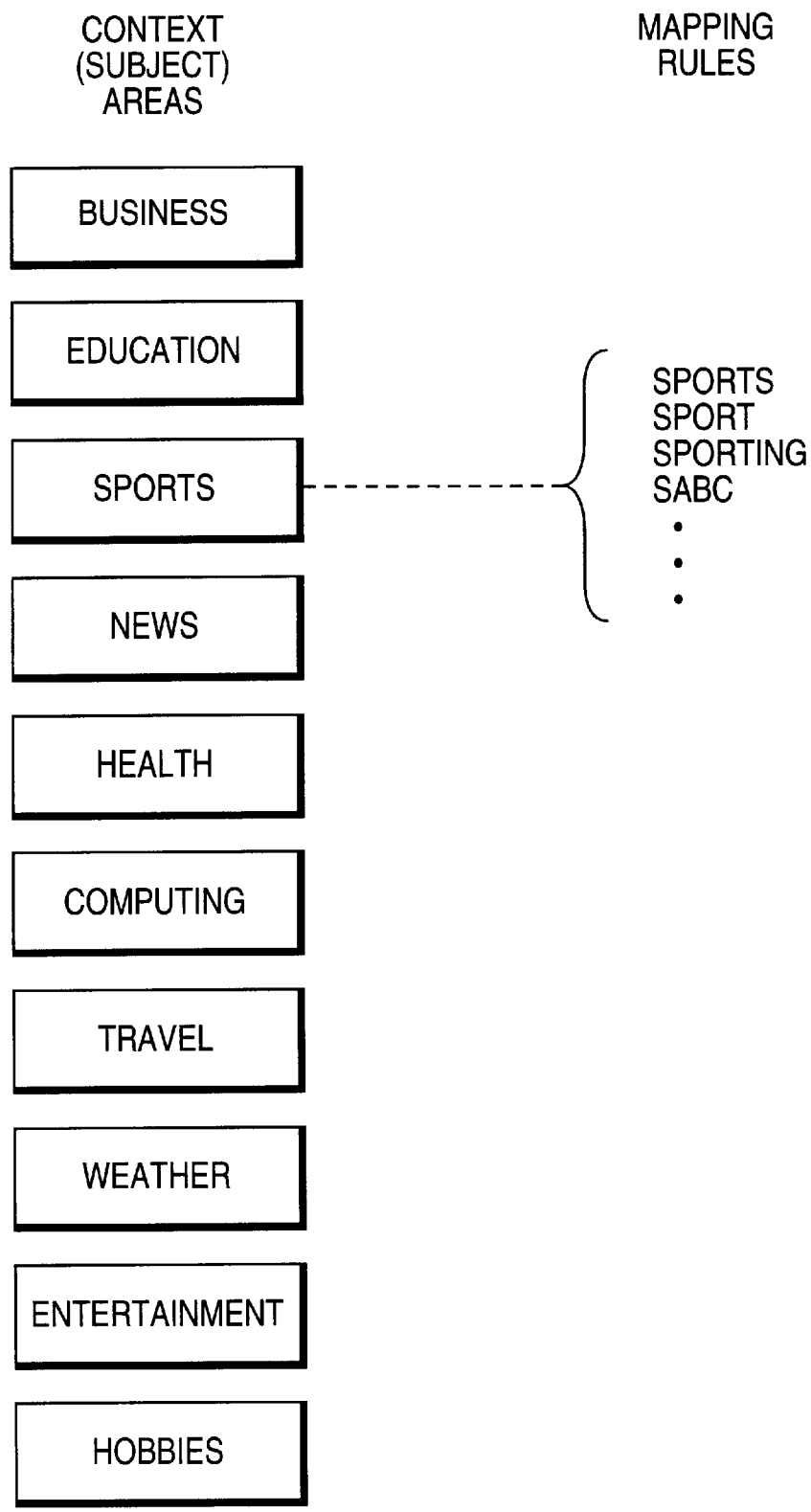
FIG. 7 shows exemplary mapping rules of mapping web page files into subject areas, in accordance with the present invention.

Referring to FIG. 7, there is shown exemplary mapping rules (stored in subject or context map 114) of mapping web page files into subject areas, in accordance with the present invention.

As shown in FIG. 7, the subject areas can be divided into: business, education, sports, news, health, computing, travel, weather, entertainment, and hobbies.

In mapping web page files into a subject area, more than one key word can be mapped into a subject area, because in reality the web page files and file systems in web sites may not use the same terminology as used the subject areas shown in FIG. 7. For example, in FIG. 7, key words sports, sport, sporting and sabc are all mapped into sports subject area. Thus, all the URLs containing key words sports, sport, sporting, or sabc, which are located between the first and second signal slashes ("/"), are mapped into sports subject area. The mapping rules do not relay on the key words at certain levels in the URLs, and the mapping rules can be modified by users via a user interface.

Figure 8:
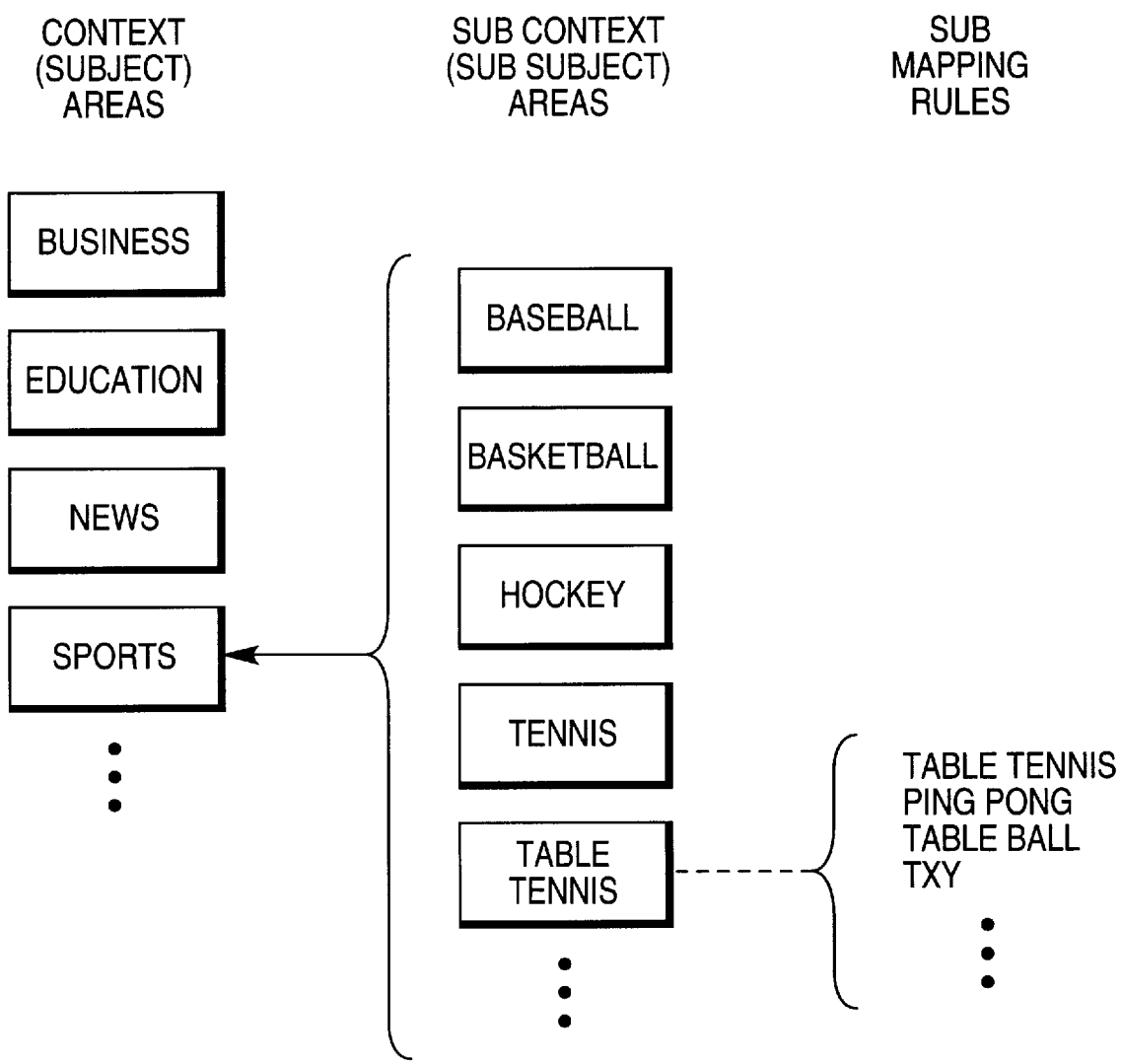
FIG. 8 shows exemplary sub mapping rules of mapping web page files into sub subject areas, in accordance with the present invention.

Referring to FIG. 8, there is shown exemplary sub mapping rules (stored in subject or context map) of mapping web page files into sub subject areas, in accordance with the present invention.

As shown in FIG. 8, sport subject area can be further divided into sub subject areas including: baseball, basketball, hockey, tennis, table tennis, . . .

In mapping web page files into a sub subject area, more than one key word can be mapped into a subject area. For example, in FIG. 8, the key words table tennis, ping pong, table ball, txy are all mapped into table tennis sub subject area. Thus, all the URLs containing table tennis, ping pong, table ball, or txy, that are located between the second and third single slashes ("/") or after the second slash ("/"), are mapped into table tennis sub subject area.

Figure 9:
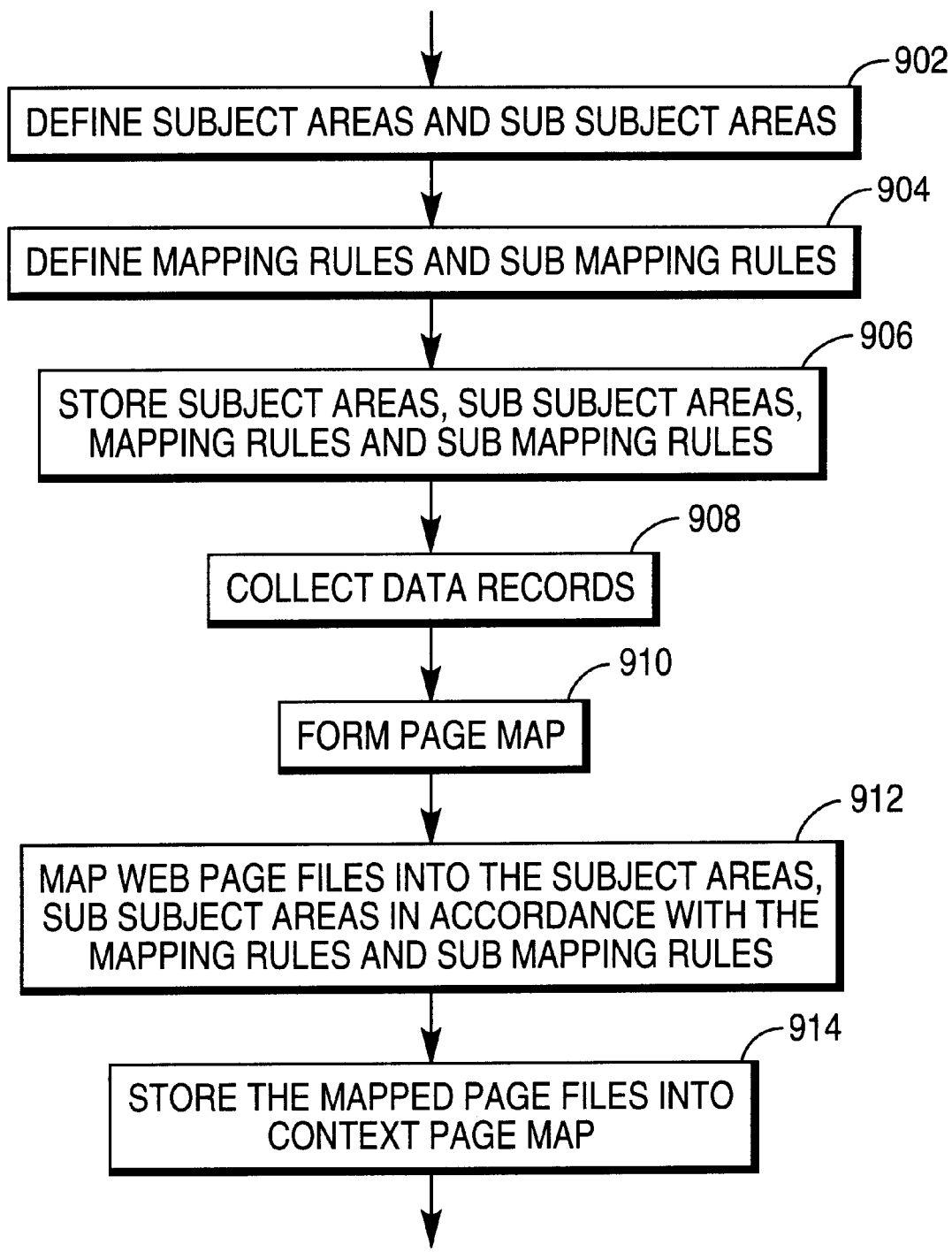
FIG. 9 shows a flowchart illustrating the operation of mapping web page files into subject areas and sub subject areas based on the mapping rules and sub mapping rules, in accordance with the present invention.

Referring to FIG. 9, there is shown a flowchart illustrating the operation of mapping web page files into subject areas and sub subject areas (shown in FIGS. 7 and 8) based on mapping rules and sub mapping rules, in accordance with the present invention.

In step 902, utility application 112 defines subject areas and sub subject areas based on either classifications predetermined or entered by a user via a graphic user interface.

In step 904, utility application 112 defines mapping rules and sub mapping rules (shown in FIGS. 7 and 8) based on either rules predetermined or entered by a user via the graphic user interface.

In step 906, utility application 112 stores the subject areas, sub subject areas, mapping rules, and sub mapping rules into subject map 114.

In step 908, utility application 112 collects data records from logs ($104._1$, $104._2$, $104._3$ and $104._4$).

In step 910, utility application 112 forms page map 113 by performing the steps shown in FIG. 4.

In step 912, utility application 112 maps the web page files in page map 113 into the subject areas and sub subject areas based on the mapping rules and sub mapping rules stored in subject (or context) map 114.

According to one method, utility application 112 parses URLs into sections (divided by single slashes). The utility application then uses the information contained between the first and second single slashes of the URLs to map the respective web page files (stored in page map 113) into the subject areas, and the information contained between the second and third single slashes (or after second single slash) of the URLs to map the respective web page files into the sub subject areas, in accordance with the mapping rules and sub mapping rules stored in subject (or context) map 114.

According to another method, utility application 112 parses the data records in the server logs to collect the parameters that were passed with URLs and then given to an application running the servers. For example as shown in FIG. 6, a parameter is tigers in the "leam=tigers" string passed with the URL (d). Utility application 112 then maps the respective web page files into subject areas and sub subject areas, in accordance with the parameters and parameter-mapping rules and parameter-sub-mapping rules (stored in subject map 114).

According to still another method, utility application 112 searches a set of key words in the contents of the web page files (stored in web page file repository $103._1$, $103._2$, $103._3$, and $103._4$). For example, the primary key works can be sports, sport, sporting; and the secondary key words can be table tennis, ping pong, and table ball. Utility application 112 then maps the web page files (stored in page map 113) into the subject areas and sub subject areas; in accordance with the key works and the mapping rules and sub mapping rules stored in subject (or context) map 114.

According to yet another method, utility application 112 searches a set of tags in the web page files and other type files (stored in web page file repository $103._1$, $103._2$, $103._3$, and $103._4$). Typically, a tag is contained in a web page file or an other type file and invisible to users. And it indicates classifications of the web page files or the other type files. For example, the primary tags can be business, education, sports, . . . , hobbies; and the secondary tags can be basketball, baseball, hockey, . . . Utility application 112 then maps the web page files (stored in page map 113) into the subject areas and sub subject areas; in accordance with the tags and the mapping rules and sub mapping rules stored in subject (or context) map 114.

In step 914, utility application 112 stores the mapped files into subject (context) page map 115.

Figure 10:
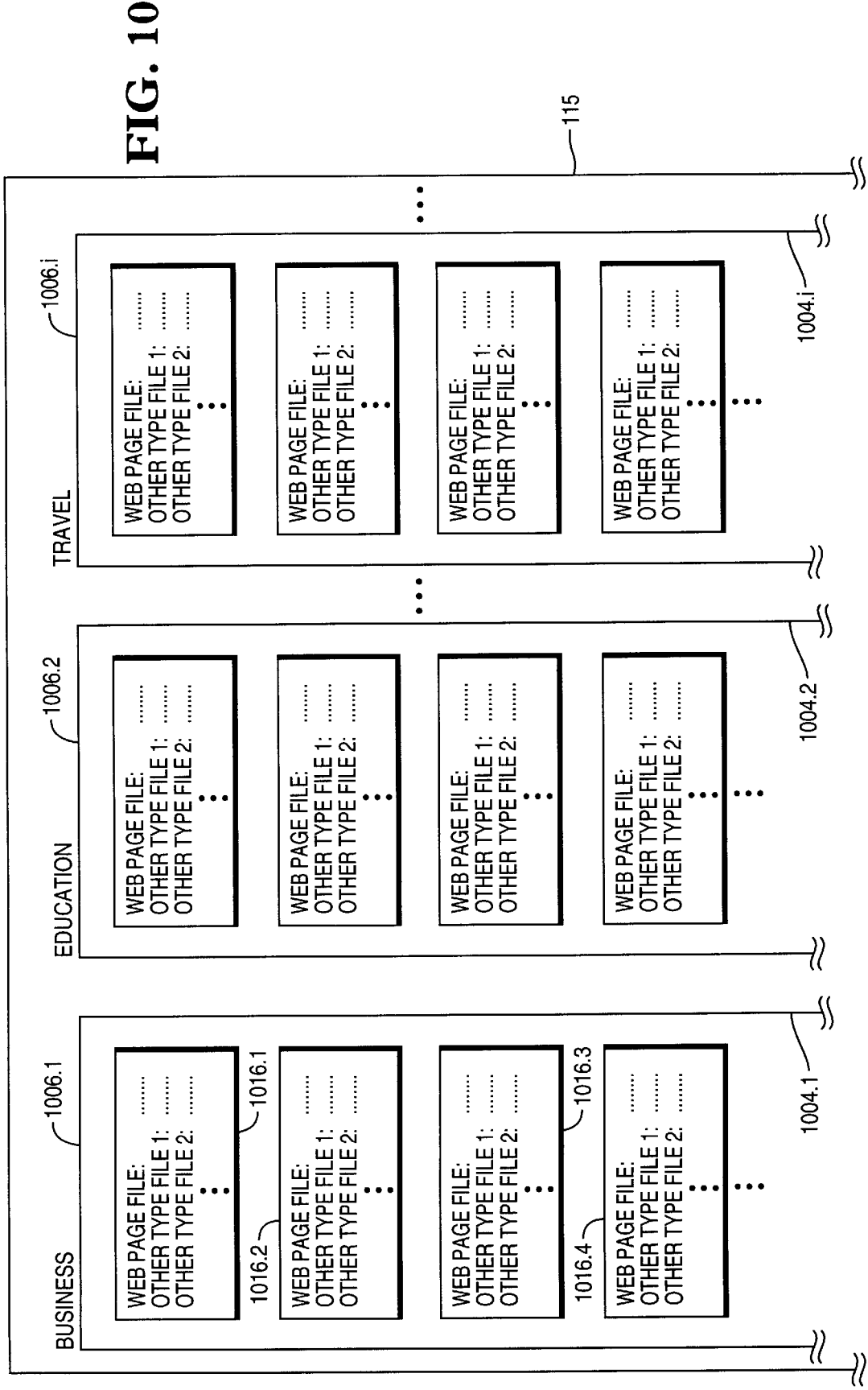
FIG. 10 shows subject (context) map including a plurality of exemplary web page files mapped into subject areas based on the mapping rules, in accordance with the present invention.

Referring to FIG. 10, there is shown a plurality of exemplary record units in subject page map 115, in accordance with the present invention.

As shown in FIG. 10, subject page map 115 includes a plurality of record units ($1006._1$, $1006._2$, . . . , $1006._i$, . . . ) for subject areas business, education, . . . , travel, . . . , respectively. Each of the record units contains a plurality of page files that are mapped into a subject area.

Figure 11:
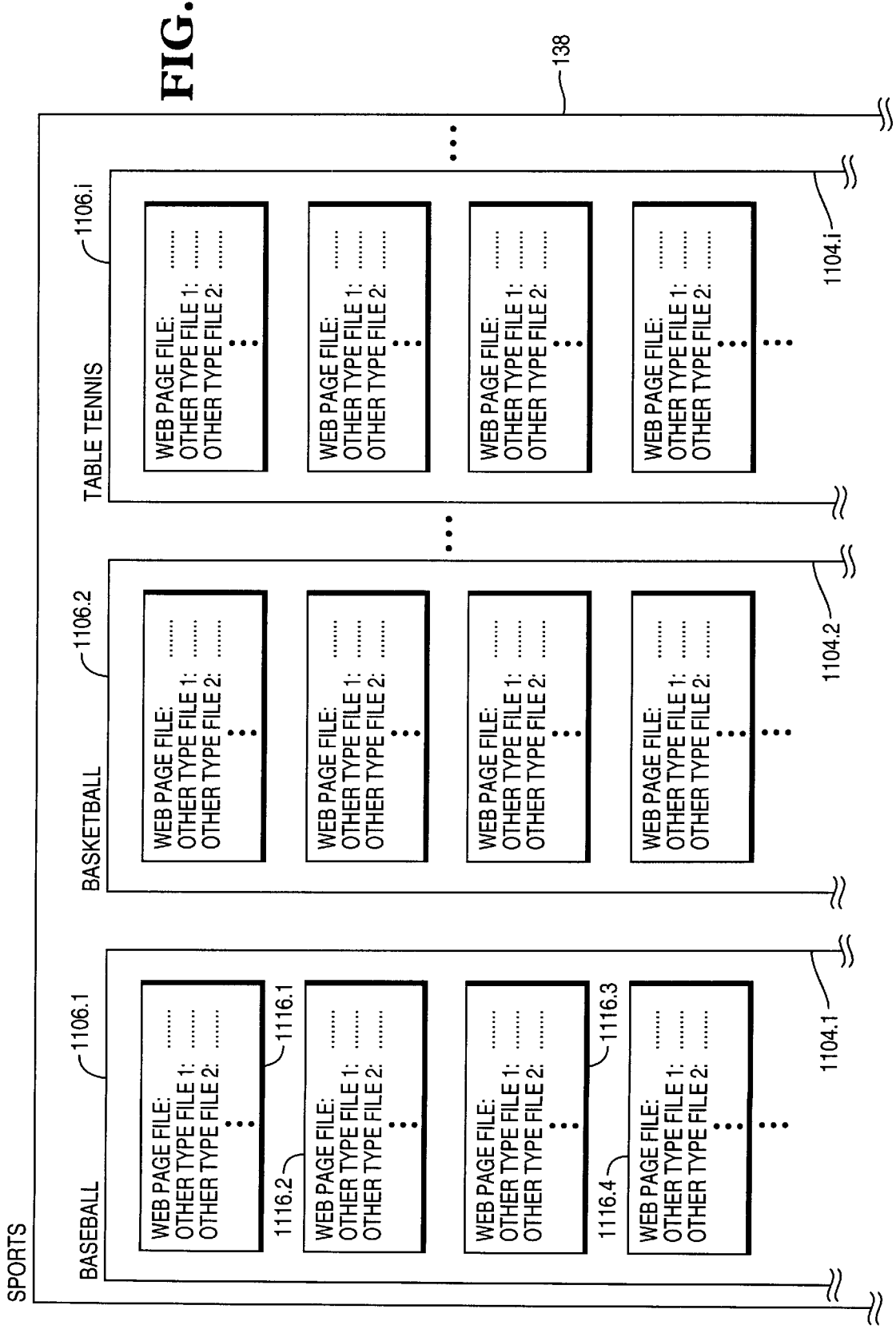
FIG. 11 shows subject (context) map including a plurality of exemplary web page files mapped into sub subject areas based on the sub mapping rules, in accordance with the present invention.

Referring to FIG. 11, there are shown a plurality of exemplary record units in subject page map 115, in accordance with the present invention.

As shown in FIG. 11, subject page map 115 includes a plurality of record units ($1106._1$, $1106._2$, . . . , $1106._i$, . . . ) for sub subject areas baseball, basketball, . . . , table tennis, . . . , respectively. Each of the record units contains a plurality of page files that are mapped into sports subject area.

Figure 12:
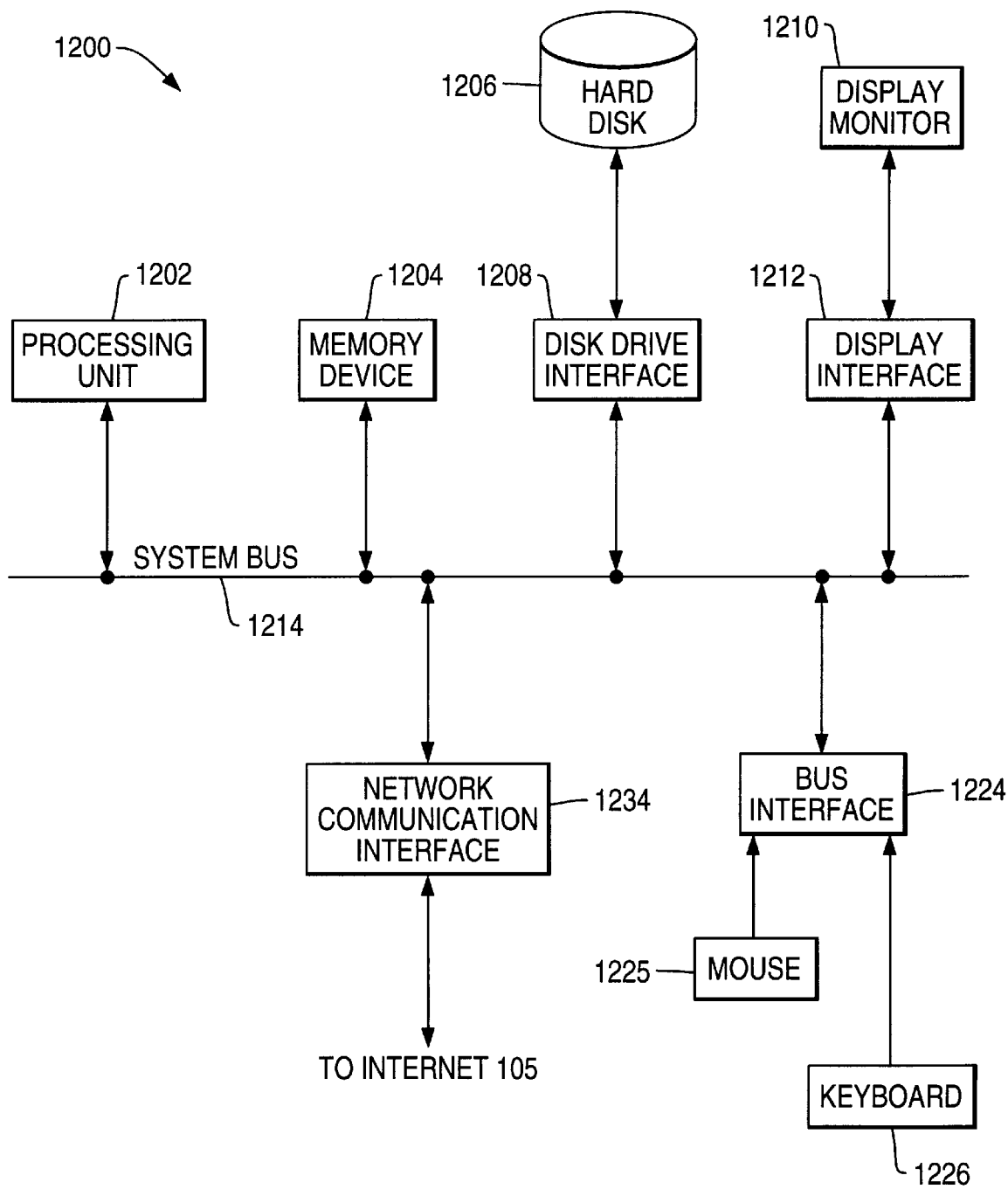
FIG. 12 shows an exemplary computer system that can run the utility application, in accordance with the preset invention.

Referring to FIG. 12, there is shown an exemplary computer system 1200 used as data processing computer to run utility application 112, in accordance with the preset invention.

As shown in FIG. 12, computer system 1200 comprises a processing unit 1202, a memory device 1204, a hard disk 1206, a disk drive interface 1208, a display monitor 1210, and display interface 1212, a bus interface 1224, a mouse 1225, a keyboard 1226, a network communication interface 1234, and a system bus 1214.

Hard disk 1206 is coupled to disk drive interface 1208, display monitor 1210 is coupled to display interface 1212, and mouse 1225 and keyboard 1226 are coupled to bus interface 1224. Coupled to system bus 1214 are: processing unit 1202, memory device 1204, disk drive interface 1208, display interface 1212, bus interface 1224, and network communication interface 1234.

Memory device 1204 is able to store programs (including instructions and data). Operating together with disk drive interface 1208, hard disk 1206 is also able to store programs. However, memory device 1204 has faster access speed than hard disk 1206, while hard disk 606 has higher capacity than memory device 1204.

Operating together with display interface 1212, display monitor 1210 is able to provide visual interface between programs being executed and a user.

Operating together with bus interface 1224, mouse 1225 and keyboard 1226 are able to provide inputs to computer system 1200.

Network communication interface 1234 is able to provide an interface between computer system 1200 and Intranet 107.

Processing unit 1202, which may include one or more processors, has access to memory device 1204 and hard disk 1206, and is able to control operations of the computer by executing programs stored in memory device 1204 or hard disk 1206. Processing unit 1202 is also able to control the transmissions of programs and data between memory device 1204 and hard disk 1206.

In the present invention, utility application 112, page map 113, subject map 114, and subject page map 115 can be stored in either memory device 1204 or hard disk 1206. Utility application 112 can be executed by processing unit 1202.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. In using with a set of logs containing data records indicating access status for a plurality of web page files, a method comprising the steps of:
    (a) storing a plurality of subject areas for classifying the web page files;
    (b) storing a plurality of mapping rules to map the data records into the subject areas;
    (c) collecting data records from the logs; and
    (d) correlating the data records with the subject areas based on the mapping rules.

2. The method of claim 1, the subject areas including any two or more of following subject areas: business, education, news, health, computing, travel, weather, entertainment, hobbies, and sports.

3. The method of claim 1, further comprising the steps of:
    analyzing the data records correlated in step (d) to generate information based on the subject areas; and
    generating a report arranging the information in accordance to the subject areas.

4. The method of claim 1, the data records containing Universal Resource Locators (URLs) for linking respective web page files, wherein:
    step (b) stores the mapping rules that are able to map the data records into the subject areas based on information contained in the URLs; and
    step (e) correlates the data records with the subject areas based on the information contained in the URLs.

5. The method of claim 1, wherein:
    step (b) stores mapping rules that are able to map the data records into the subject areas based on parameters for retrieving at least one of the web page files; and
    step (e) correlates the data records with the subject areas based on the parameters.

6. The method of claim 5, wherein the parameters are provided by users who have accessed at least one of the web page files.

7. The method of claim 5, the data records containing Universal Resource Locators (URLs) for linking respective web page files, and the parameters being contained in the URLs.

8. The method of claim 1, further comprising the steps of:
    storing a plurality of sub subject areas for each of the context areas;
    storing plurality of sub mapping rules to map the data records to the sub subject areas; and
    correlating the data records with the subject areas and sub subject areas bases on the mapping rules and sub mapping rules.

9. The method of claim 1, wherein:
    step (b) stores mapping rules that are able to map the data records into the subject areas based on one or more key words contained in the web page files; and
    step (e) correlates the data records with the subject areas based on the one ore more key words.

10. The method of claim 1, wherein:
    step (b) stores mapping rules that are able to map the data records into the subject areas based on one or more tags contained in the web page files; and
    step (e) correlates the data records with the subject areas based on the one or more tags.

11. In using with a server containing a plurality of web page files, a method comprising the steps of:
    (a) storing a plurality of subject areas for classifying the web page files;
    (b) storing a plurality of mapping rules to map the data records into the subject areas;
    (c) searching key words from the web page files; and
    (d) correlating the data records with the subject areas based on the mapping rules and key words.

12. The method of claim 11, the subject areas including any two or more of following subject areas: business, education, news, health, computing, travel, weather, entertainment, hobbies, and sports.

13. In using with a server containing a plurality of web page files, a method comprising the steps of:
    (a) storing a plurality of subject areas for classifying the web page files;
    (b) storing a plurality of mapping rules to map the data records into the subject areas;
    (c) searching tags from the web page files; and
    (d) correlating the data records with the subject areas based on the mapping rules and tags.

14. The method of claim 13, the subject areas including any two or more of following subject areas: business, education, news, health, computing, travel, weather, entertainment, hobbies, and sports.

* * * * *